(12) United States Patent
Rosadini et al.

(10) Patent No.: US 12,244,615 B2
(45) Date of Patent: Mar. 4, 2025

(54) METHOD FOR PROTECTION FROM CYBER ATTACKS TO A VEHICLE BASED UPON TIME ANALYSIS, AND CORRESPONDING DEVICE

(71) Applicant: Marelli Europe S.p.A., Corbetta (IT)

(72) Inventors: Christian Rosadini, Corbetta (IT); Simona Chiarelli, Corbetta (IT); Walter Nesci, Corbetta (IT); Sergio Saponara, Pisa (IT); Alessio Gagliardi, Catanzaro (IT); Pierpaolo Dini, SanFrediano a Settimo Cascina Pisa (IT)

(73) Assignee: Marelli Europe S.p.A., Corbetta (IT)

( * ) Notice: Subject to any disclaimer, the term of this patent is extended or adjusted under 35 U.S.C. 154(b) by 252 days.

(21) Appl. No.: 17/929,370

(22) Filed: Sep. 2, 2022

(65) Prior Publication Data

US 2023/0080521 A1 Mar. 16, 2023

(30) Foreign Application Priority Data

Sep. 6, 2021 (IT) .......................... 102021000022919

(51) Int. Cl.
*H04L 9/40* (2022.01)
(52) U.S. Cl.
CPC ................................ *H04L 63/1416* (2013.01)
(58) Field of Classification Search
None
See application file for complete search history.

(56) References Cited

U.S. PATENT DOCUMENTS

| 11,522,878 | B2 * | 12/2022 | Hong | H04L 63/0263 |
| 2017/0286675 | A1 * | 10/2017 | Shin | H04L 63/1416 |
| 2018/0131712 | A1 * | 5/2018 | Cornelio | H04L 63/14 |

OTHER PUBLICATIONS

Search Report for Italian Patent Application No. 202100022919 dated Apr. 12, 2022.

(Continued)

*Primary Examiner* — Fatoumata Traore
(74) *Attorney, Agent, or Firm* — Howard & Howard Attorneys PLLC (57) ABSTRACT

A method for protection from cyber attacks in a CAN (Controller Area Network), of a vehicle including the steps of selecting periodic messages having a transmission periodicity, grouping the periodic messages, and performing an analysis of messages of the nodes that exchange the received periodic messages, which includes obtaining times of arrival at the respective nodes of a set of periodic messages that have the same message identifier, computing average-offset values over successive subsets, of a given number of messages, accumulating the average-offset values for each identifier to obtain accumulated-offset values, identifying linear parameters by computing an angular coefficient, of a regression, and an intercept, or identification error, computing a correlation coefficient of the average offset of pairs of messages identified as coming from the same node, determining whether the correlation coefficient is higher than a first given threshold, determining whether the angular coefficient between two consecutive messages with the same identifier is higher than a second given threshold, determining whether the intercept between two consecutive messages is higher than a third given threshold, and supplying the results of these determinations to a message-classification operation.

9 Claims, 8 Drawing Sheets

(56) References Cited

OTHER PUBLICATIONS

Cho, Kyong-Tak, et al., "Fingerprinting Electronic Control Units for Vehicle Intrusion Detection," USENIX, the Advanced Computing Systems Association, 25th USENIX Security Symposium, pp. 911-927 (Jan. 6, 2017).

Desai, Deepak, et al., "Attacker Identification Using Low-Level Characteristics of Automotive ECUs," Master's Thesis, Department of Computer Science and Engineering, Chalmers University of Technology, University of Gothenburg, Gothenburg, Sweden (Oct. 13, 2020) (102 pages).

Halder, Subir, et al., "COIDS: A Clock Offset Based Intrusion Detection System for Controller Area Networks," Proceedings of the 21st International Conference on Distributed Computing and Networking, Jan. 4-7, 2020, Kolkata, India (Jan. 4, 2020) (10 pages).

Sagong, Sang Uk, et al., "Cloaking the Clock: Emulating Clock Skew in Controller Area Networks," 2018 9th ACM/IEEE International Conference on Cyber-Physical Systems, IEEE, pp. 32-42 (Apr. 11, 2018).

\* cited by examiner

METHOD FOR PROTECTION FROM CYBER ATTACKS TO A VEHICLE BASED UPON TIME ANALYSIS, AND CORRESPONDING DEVICE

CROSS-REFERENCE TO RELATED APPLICATIONS

The present application claims priority to and all the benefits of Italian Patent Application No. 102021000022919, filed on Sep. 6, 2021, which is hereby expressly incorporated herein by reference in its entirety.

BACKGROUND OF THE INVENTION

1. Field of the Invention

The present invention relates to techniques for protection from cyber attacks in a communication network, in particular a CAN (Controller Area Network), of a vehicle, the network comprising a bus, in particular a CAN-bus, and a plurality of nodes associated to the bus in a signal-exchange relationship and associated at least in part to control units for controlling functions of the vehicle.

2. Description of the Related Art

The CAN-bus, adopted as communication bus in motor vehicles, is a communication device of a serial and multimaster type, in which each master, also referred to as node, connected to the bus is able to send, receive, and solve the conflicts of simultaneous access in transmission by a number of nodes.

Figure 1:
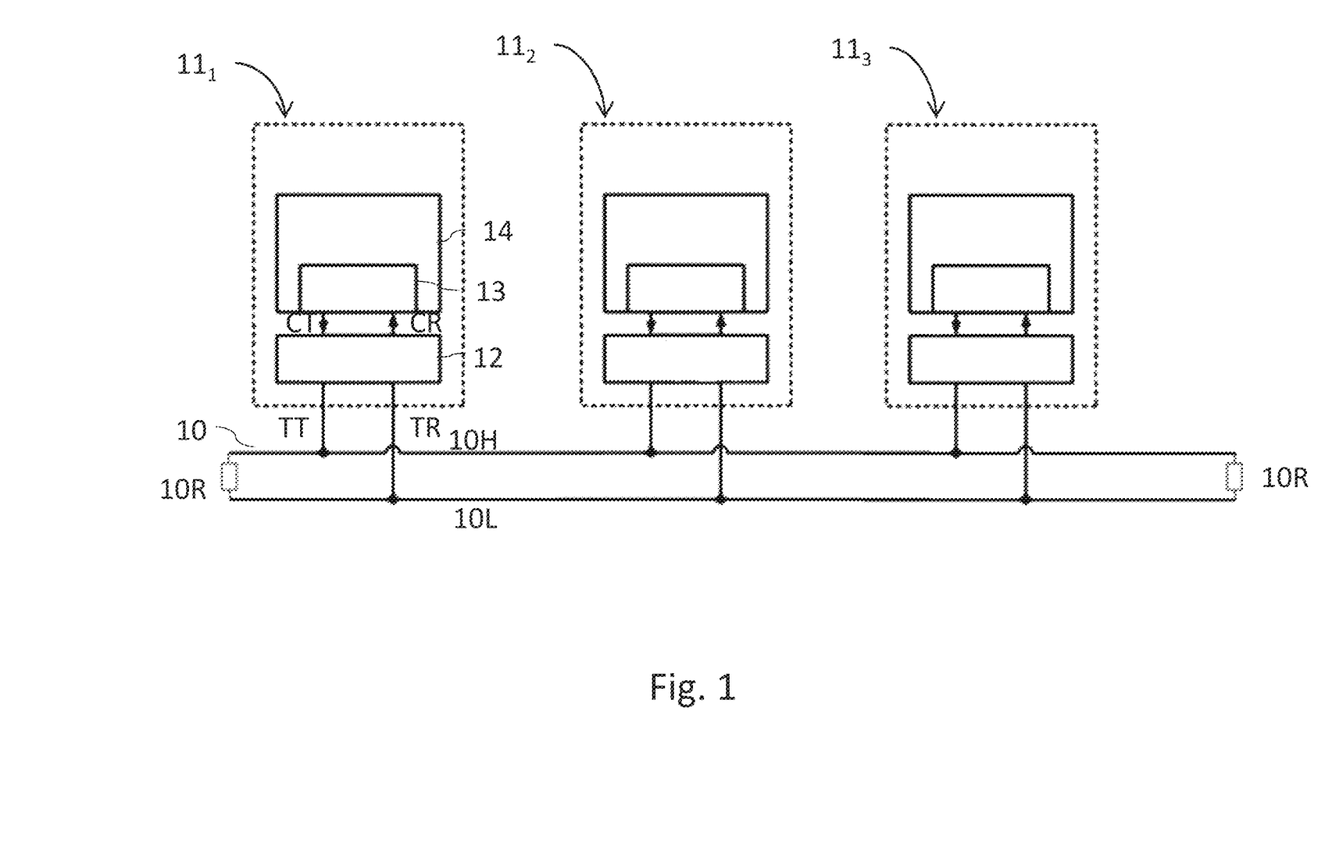

Schematically illustrated in FIG. 1 is a CAN-bus 10, comprising a plurality of nodes 11. Indicated in FIG. 1 are three nodes $11_1, \ldots, 11_3$. A node 11, which is able to communicate on a CAN-bus 10, in general comprises, as shown in FIG. 1:
- a CAN transceiver 12, which is associated, through a transmission line TT and a reception line TR, to the CAN-bus 10 and is configured for managing the electrical levels proper to the CAN-bus (physical layer of the OSI model);
- a CAN controller 13, which is connected, through a transmission line CT and a reception line CR, to the CAN transceiver 12, and is configured for managing the logic levels and the serialization of the CAN-bus 10 (data-link layer of the OSI model); and
- a microcontroller 14, which contains the logic of transmission and reception of the messages (management of the OSI layers higher than the data-link layer).

The bus 10 comprises two lines. Denoted by 10H is the high line of the CAN-bus 10, or CAN-high, while denoted by 10L is the low line, or CAN-low. At the two ends of the bus 10 the two lines 10H and 10L are terminated by termination resistances 10R. In FIG. 1, the transmission lines TT are coupled to the high line 10H, whereas the reception lines TR are coupled to the low line 10L.

Hence, the CAN-bus 10 is a differential bus and therefore has a structure with two lines, referred to as "CAN-high" 10H and "CAN-low" 10L.

The methods of identification of malicious messages in a CAN-bus that connects a plurality of nodes, for example electronic control units (ECUs), attempt to determine what message is malicious, but above all from what node or ECU the message originates, so as to be able to track the source itself of the attack and adopt the necessary measures. The intrusion-detection systems currently implemented on vehicles manage to determine the presence of a cyber attack, but are not equipped with an attacker-recognition system.

Provided in Table 1 is the structure of a message according to the CAN protocol; in particular, the message of a data type is structured with sections S of contiguous bits, as listed below.

TABLE 1

| Section S [size in bits] | Content of section S |
| --- | --- |
| S1 SOF [1 bit] | start of CAN message |
| S2 Arbitration Field [12/32 bits] | contains message identifier ID |
| S3 Control Field [6 bits] | contains the information of the length of the data transmitted |
| S4 Data Field [0-64 bits] | data section (information content of the message) |
| S5 CRC Field [16 bits] | integrity-check code (with delimiter field) |
| S6 ACK Field [2 bits] | to confirm proper reception by the other nodes (with delimiter field) |
| S7 EoF [7 bits] | area of recessive bits necessary for signalling end-of-message |
| S8 ITM [3 bits] | intermission area, i.e., area of recessive bits that functions as separator between messages |

The fields of interest of the message are mainly the arbitration field S1 and the ACK (Acknowledge) field S6. The arbitration field is constituted by the message ID (IDentifier), which determines the priority thereof and identifies the message. The smaller the binary value, the higher the priority. The ACK bit, which is originally recessive (and hence at 1), is overwritten with a dominant bit by the ECUs or nodes 11 that correctly receive the message. In this way, each node acknowledges the integrity of the message.

As regards the aforesaid arbitration field S2, the CAN Controller 13 of a node 11 reconstructs the identifier ID of the message from the logic signals that reach it (which are obviously consistent with the physical layer detected by the CAN Transceiver 12), whereas the microcontroller 14 within the node 11 itself associates to the aforesaid message a "time variable", referred to as timestamp, of arrival. Each CAN node 11 connected to the network 10 is configured with a set of identifiers ID that it can transmit, where each identifier ID in this set may correspond to a parameter of a sensor or else to a specific function (diagnosis, etc.). The above message identifiers ID, albeit different for different nodes 11, can be cloned by a possible attacker, if the latter acquires control of one of the nodes of the network. Moreover, the messages sent through the CAN 10 may have a periodic nature, and thus be transmitted in a precise period, or else an aperiodic nature, and thus be transmitted upon the occurrence of events.

Techniques are hence known based upon the time drift, which are aimed at the messages, which in principle are thought as being periodic. Thus, by exploiting the time variable, it is possible to arrive at an estimate of the period between two consecutive messages having the same identifier ID. If a message is periodic, it is associated to a timestamp (reception time) that is specific, but in any case constant in the period. Consequently, it is assumed that, however similar two distinct ECUs that represent two nodes 11 may be and even though they may be produced by the same manufacturer and even with the same circuit components, they have two different time drifts. Each ECU in fact can function thanks to the respective clock signal, and even though two ECUs can function with a clock at the same frequency, in actual fact this results in a random drift in the period between the two signals, which has repercussions on transmission of CAN messages. Consequently, the aforesaid skew in actual fact represents a non-reproducible factor intrinsic of each ECU node, which can be estimated applying certain techniques.

Described hereinafter are some typical scenarios of attack.

One type of attack is referred to as "fabrication attack". Through an in-vehicle ECU compromised in such a way as to be a strong attacker, the adversary fabricates and injects messages with forged ID (Identifier), DLC (Data-Length Code), and data. The objective of this attack is to override any periodic messages sent by legitimate safety-critical ECUs, so that their receiver ECUs get distracted or become inoperable. For instance, the attacker injects various malicious messages with a given ID, for example 0xB0, which is usually sent by a legitimate ECU, at a high frequency. Thus, other nodes that normally receive the message 0xB0 are forced to receive the fabricated attack messages more frequently than the legitimate ones. In such a case, the attacker ECU is carrying out a fabrication attack on the message 0xB0 and on its original transmitter, the legitimate ECU.

Another type of attack is referred to as "suspension attack". To carry out a suspension attack, the attacker needs just one weakly compromised ECU. As in the case of Denial-of-Service (DoS) attacks, the objective of this attack is to stop/suspend transmission by the weakly compromised ECU, thus preventing delivery/propagation of information that is acquired by other ECUs on the CAN, the reason for this being that some ECUs must receive specific information from other ECUs for their proper operation. Consequently, the suspension attack can damage not only the weakly compromised ECU, but also other receiver ECUs.

Another type of attack is referred to as "masquerade attack". To mount a masquerade attack, the attacker needs to compromise two ECUs, one as a strong attacker and the other as a weak attacker. The objective of this attack is to manipulate an ECU while masking the condition of the ECU being compromised. Up to a given masquerade instant, the adversary monitors and learns which messages are sent and at what frequency by its weaker attacker; for example, the weak attacker sends the message 0xB0 every 20 ms. Since most network messages are periodic and broadcast, for example, over CAN, it is easy to learn their identifiers (IDs) and the transmission intervals. Once the adversary has learned the ID and the frequency of a message, at the masquerade instant the adversary stops transmission of its weak attacker and utilizes its strong attacker to fabricate and inject attack messages with ID=0xB0. Stopping transmission of the weak attacker and exploiting the strong attacker for transmission of malicious messages has the purpose of overcoming the inability of the weak attacker to inject messages. After the masquerade instant, the original transmitter of 0xB0, i.e., the weak attacker, does not send that message, whereas the strong attacker sends it, instead, at its original frequency. So, when the traffic of the bus, for example, the CAN-bus, is observed, the frequency of the message 0xB0 remains the same, whereas its transmitter has changed.

From the above examples, it is evident how important it is to manage to discriminate from which ECU the attack really comes, especially in the case of a masquerade attack. In this regard, it may be noted that a drawback of the bus such as the CAN-bus is the absence of a MAC Address that makes it possible to trace directly back to the electronic control unit/device 11 that has sent the message at that precise moment on the bus, unlike, for example, the Ethernet protocol, where the MAC Address is instead present.

SUMMARY OF THE INVENTION

The object of the present invention is to provide a monitoring method that will make it possible to identify the electronic control unit that transmits a message, in particular a message linked to an attack.

According to the present invention, the above object is achieved thanks to a protection method, as well as to a corresponding protection device, that present the characteristics referred to specifically in the ensuing claims.

Other objects, features and advantages of the present invention will be readily appreciated as the same becomes better understood after reading the subsequent description taken in connection with the accompanying drawings.

BRIEF DESCRIPTION OF THE DRAWINGS

The invention will be described with reference to the annexed drawings, which are provided purely by way of non-limiting example and in which:

FIG. 1 has already been described previously;

DETAILED DESCRIPTION OF THE INVENTION

According to the solution described herein, it is envisaged to insert one or more devices for protection from cyber attacks within the network 10 of the vehicle, in particular the CAN-bus, which implements the method for protection from cyber attacks described herein. This device for protection from cyber attacks may be additional to the existing network topology or else may be comprised in one of the existing nodes, in particular by configuring the microcontroller 14.

Each of the aforesaid devices may be responsible for analysis of the data traffic for a finite number of nodes of the network 10 of the vehicle, which in general describe a subnetwork of the entire communication architecture. For example, the subnetworks may have up to 18 nodes.

The purpose of the method and device described herein is to ensure that the communication on the CAN-bus corresponding to a specific subnetwork will not present anomalies such as the ones described previously.

In general, the method for protection from cyber attacks described herein envisages that for each vehicle network 10 there will be made available or accessible to a control node (device 20) a list of message identifiers ID, of the type indicated in Table 1, to be analysed. The list contains the information of which messages are periodic and consequently which messages are in actual fact analysed by the method.

The periodic messages that belong to the list of the messages supplied beforehand are grouped together on the basis of their periodicity in order to prevent erroneous classifications due to the fact that the time drift of some messages with different period and identifier ID (as well as the same node of origin) could be the same. Hence, a first operation of grouping or clustering by period is carried out upstream of the analysis of the time drift itself.

In other words, provided herein is a method for protection from cyber attacks in a communication network, in particular a CAN (Controller Area Network), of a vehicle, that comprises:
 a communication bus, in particular a CAN-bus, and
 a plurality of nodes associated to said communication bus in a signal-exchange relationship and associated at least in part to control units for controlling functions of the vehicle,
 said nodes exchanging messages passing between nodes of said plurality of nodes, and
 said messages being identified by respective message identifiers,
 said method includes, at a control node associated to said communication bus, the steps of:
 selecting, from among the messages exchanged between the nodes, periodic messages having a transmission periodicity,
 grouping said periodic messages into respective groups according to the respective period, and
 performing a procedure of analysis of messages of the nodes that exchange said received periodic messages, which comprises, for each group of transmission periodicity:
  obtaining times of arrival at the respective nodes of a set of periodic messages that have the same message identifier,
  computing, as a function of said arrival times, average-offset values over successive subsets, of a given number of messages, of said set of received messages,
  accumulating said average-offset values for each identifier with respect to each successive subset to obtain accumulated-offset values for each successive subset and a respective identifier,
  identifying linear parameters by computing a regression over said accumulated-offset values for each successive subset and respective identifier, said computation comprising computing an angular coefficient, or slope, of the regression, and an intercept, or identification error,
  computing, on the basis of average-offset values obtained at the step of computing as a function of said arrival times average-offset values over successive subsets, a correlation coefficient of the average offset of pairs of messages identified as coming from one and the same node,
  performing a first check to determine whether the correlation coefficient is higher than a first given threshold,
  performing a second check to determine whether the angular coefficient between two consecutive messages with the same identifier is higher than a second given threshold,
  performing a third check to determine whether the intercept between two consecutive messages is higher than a third given threshold, and
  supplying the results of said first check, said second check, and said third check to a message-classification operation, configured to supply a confirmation of classification of the messages according to the transmitting node and message identifier or an indication of classification error as a function of said results.

Figure 2:
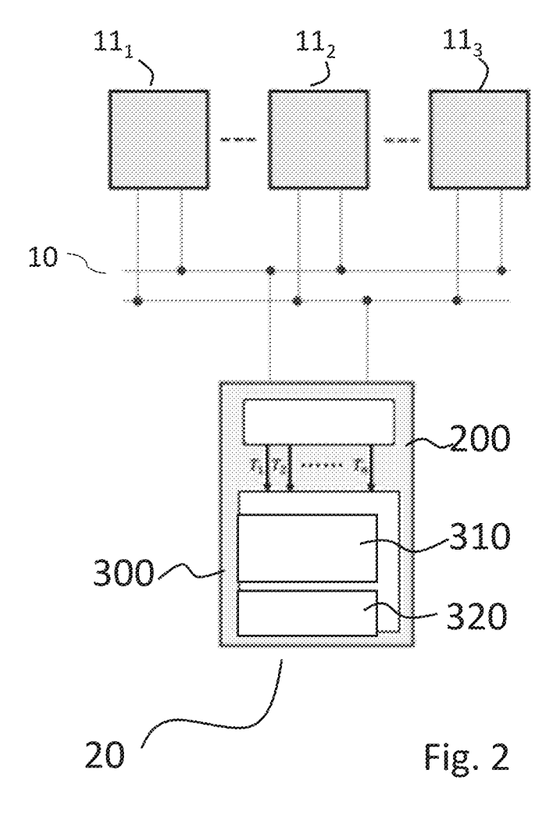
FIG. 2 represents a diagram that shows a device that implements the method described herein.

In greater detail, FIG. 2 hence shows a device 20 for protection from attacks connected to the CAN-bus 10, together with the nodes 11, i.e., a control node for analysing the messages exchanged over the network 10. As has been said, the device 20 is a control node of the network that has available or accessible a list of message identifiers ID, of the type indicated in Table 1, to be analysed. The device 20 comprises a block 200 representing an operation of clustering and a block 300 representing a procedure of message analysis comprising a fingerprinting procedure 310, i.e., a procedure of identification of nodes on the basis of respective unique fingerprints, in particular fingerprints obtained from the respective time drifts, and an anomaly-detection procedure 320, which, on the basis of the node identifications, detects whether an anomaly, in particular an attack, is in progress.

As has been said, in one embodiment, the above device for protection from attacks 20 is comprised in a node with a structure similar to that of the nodes 11, and hence comprises a CAN transceiver 12 and a CAN controller 13 included in a microcontroller 14. In FIG. 2, these elements are not shown in detail; the device 20 is internally represented schematically via blocks that illustrate operations or procedures of the method for protection from attacks described herein. As has been said, the above method may be executed by a microcontroller 14 configured to execute the above method, downstream of reception of the messages by the transceiver 12 and downstream of the operations of the controller 13 (e.g., managing of the logic levels and serialization of the CAN-bus 10).

Hence, the method executed in the device 20 comprises, once messages have been received, for example through the modules 12 and 13, carrying out the aforementioned preliminary grouping or clustering operation, in block 200. In particular, the received messages, on the basis of their identifier ID and on the basis of the list of message identifiers ID and corresponding periods T, which is information available to the device 20, are divided into respective groups or clusters according to the period $T_1, \ldots, T_n$.

Then, in block 300, for each group corresponding to a respective period $T_1, \ldots, T_n$ each message received at the device 20 is processed so as to take into account the time drift.

For each of the ECUs, i.e., for each node 11, of the CAN 10 on board the vehicle, the instants of transmission of each periodic message are determined on the basis of the clock signal defined by a clock with quartz crystal, present in the node 11. Following the NTP (Network Time Protocol) convention, denoted here by $C_{true}$ is the "true" clock signal, which represents at each instant the true time variable, and denoted by $C_i$ is another clock that is "untrue" in order to define the terms clock offset, clock frequency and clock skew as follows:
 clock offset: this is the difference between the time variables given by $C_i$ and $C_{true}$; in particular, we define "relative offset" as the difference between two consecutive $C_i$;

clock frequency: this is the rate of variation of the untrue clock signal $C_i$; in analytical terms, it is nothing but the time derivative of the untrue clock signal $C_i$; and clock skew: this is the difference between the frequency associated to the untrue clock signal $C_i$ and the frequency associated to $C_{true}$; in particular, the relative skew is defined as the difference between two frequencies associated to consecutive $C_i$.

If two clock signals have a relative offset and a skew of 0, then we say that they are synchronized. Otherwise, they are considered as non-synchronized. Since the CAN-bus, such as the bus 10, lacks synchronization of the clock signals in the respective nodes 11, it is considered as being non-synchronized. The offsets and skews of the clock of the non-synchronized nodes depend exclusively upon their local clocks; consequently, they are distinct from the others.

In particular, the timestamp proper to each ECU 11 includes a clock skew of its own. Through an in-depth analysis of the skew for each ECU 11 it is possible to classify the various ECUs in a CAN 10 with multiple nodes.

Figure 3:
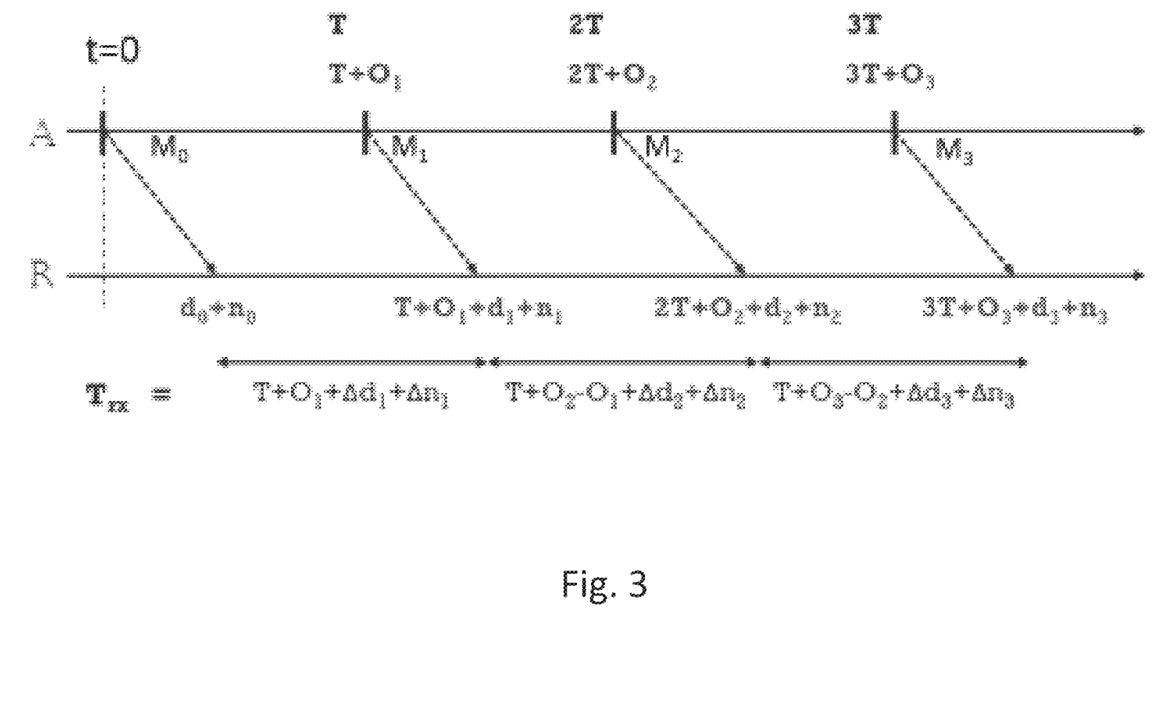
FIG. 3 represents a timing chart that shows messages transmitted over the communication network in the context of the method described herein.

As shown in FIG. 3, considering an ECU A that transmits messages $M_0, \ldots, M_3$ with period T, where T is here assumed to indicate also the value of T milliseconds, and an ECU R, receiver ECU, which periodically receives the above messages $M_0, \ldots, M_3$, from the standpoint of the receiver ECU R, since only its timestamp is available, its clock is considered as if it were the "true" one, $C_{true}$. On account of the asymmetry of the clock, the periodic messages $M_0, \ldots, M_3$ are sent at moments with slight offsets from the ideal values (for example, T, 2T, 3T, . . . ). It is assumed for simplicity that a time t=0 is the moment when the first message $M_0$ was sent by the ECU A, and $O_i$ is the offset of the clock of the ECU A when it sends the i-th message $M_i$ starting from t=0. In relation to FIG. 3, the index indicates the received message. Hence, after a network delay $d_i$, the receiver ECU R receives that message and associates thereto a timestamp of arrival of $iT+O_i+d_i+n_i$, where $n_i$ is the noise in the quantization of the timestamp of the receiver ECU R. Thus, the intervals between each arrival timestamp are $T_{rx,i}=T+\Delta O_i+\Delta d_i+\Delta n_i$, where designated by $\Delta X_i$ is the difference of the quantity X, for example $O_i$ or $n_i$ or $d_i$, between step i and step i−1, and $O_0=0$.

The working hypotheses are that the variation of the offset $O_i$ in a time step is negligible and the noise $n_i$ is a term of Gaussian noise with zero average so that an expected value $\mu_{T_{rx,i}}$ of the intervals of arrival timestamp can be estimated as:

$$\mu_{T_{rx,i}}=E[T_{rx,i}]=E[T+\Delta O_i+\Delta d_i+\Delta n_i]=T+E[\Delta O_i+\Delta d_i+\Delta n_i]\approx T$$

Since the lengths of the data of the CAN periodic messages, i.e., the DLCs (Data-Length Codes), are constant in time, for the moment it is considered that $E[\Delta d_i]=0$, i.e., the average of the differences in the delays $d_i$ is considered as being zero. On the basis of the timestamp of arrival of the first message, $d_0+n_0$, and of the average of the timestamp intervals, $\mu_{T_{rx}}$, the estimated instant of arrival of the i-th message is extrapolated and determined as $i\mu_{T_{rx}}+d_0+n_0$, whereas the actual measured time of arrival is $iT+O_i+d_i+n_i$. Since we are estimating the subsequent arrival times, the expected value $\mu_{T_{rx}}$ is given by the previous measurements. Given that the period T is constant in time and hence again the expected value $\mu_{T_{rx}}$ approximates the period T, the average difference between the estimated times and the measured times is given by $E[i(T-\mu_{T_{rx}})+O_i+\Delta d+\Delta n]\approx E[O_i]$. That is, from the periodicity of the message, we can estimate the average offset of the clock, $E[O_i]$, which in actual fact will be different for different transmitters.

To estimate the clock skew, the messages in arrival are processed in batches of size N (for example, N=20), on which the average offset of the k-th batch, $O_{avg}[k]$, is calculated. This calculation is expressed via the following equation in closed form:

$$O_{avg}[k] = \frac{1}{N-1}\sum_{i=2}^{N}[a_i - (a_1 + (i-1)\mu_T[k-1])] \quad (1)$$

where $\mu_T[k-1]$ is the mean time of arrival of the previous batch, and the quantity in square brackets $[a_i-(a_1+(i-1)\mu_T[k-1])]$ is the difference between the measured time of arrival $a_i$ and the estimated time of arrival for the i-th message $(a_1+(i-1)\mu_T[k-1])$. When a mean offset value is calculated from the current batch k, its absolute value is added to the accumulated offset $O_{acc}[k]$ according to the recursive equation defined below:

$$O_{acc}[k]=O_{acc}[k-1]+|O_{acc}[k]| \quad (2)$$

It is possible to use also a different formulation of the average clock offset as shown by the following Eq. 3:

$$O_{avg}[k] = \frac{1}{N}\sum_{i=1}^{N}\hat{O}_i = \frac{1}{N}[T-(a_i-a_{i-1})] = T - \frac{a_N-a_0}{N} \quad (3)$$

where $a_0$ is the measured timestamp of the last batch of messages that has been analysed (i.e., at the k−1-th step). This makes it possible to redefine the recursive equation that represents the evolution of the accumulated clock offset $O_{acc}[k]$, as in Eq. (4) below:

$$O_{acc}[k]=O_{acc}[k-1]+N|O_{avg}[k]| \quad (4)$$

Taking again as reference the situation represented schematically in FIG. 6, if the ECU R were to determine the average offset of the clock for every N received messages, since it is derived with reference to the first message (of N messages), it would represent only the average of the most recent offsets. Consequently, to obtain the total amount of the offset sustained, the accumulated clock offset $O_{acc}[k]$, the absolute values of the average clock offsets $O_{avg}[k]$ must be added together, and the absolute value of the average clock offset $O_{avg}[k]$ is pre-multiplied by the value of the number of batches N and then added to the previous value of accumulated offset at step k−1 of the calculation procedure.

The slope of the accumulated clock offset $O_{acc}[k]$ hence represents the clock skew, which is practically constant (as is technically evident]). This makes it possible to estimate the clock skew from the timestamps of arrival and hence to identify the message transmitter for detection of intrusions. For a given message identifier ID, the accumulated clock offset for the timestamps of arrival is obtained. Since the clock skew is constant, the dynamics of the accumulated clock offset is linear, and it can thus be recursively estimated with a linear-regression model. The problem of linear regression can be formulated as shown by Eq. 5 below:

$$O_{acc}[k]=S[k]t[k]+e[k] \quad (5)$$

At the generic k-th step of the calculation procedure, $O_{acc}[k]$ is the accumulated offset on the k-th batch of N messages analysed, S[k] is the regression parameter, t[k] is the time that has elapsed, and e[k] is the identification error. The regression parameter S[k] represents the slope of the linear model and hence the estimated skew of the clock. The identification error, e[k], represents the residue that is not explained by the model (the intercept). In the procedure of calculation of the parameters $O_{acc}$, S, t, O, μ, and e are updated every N messages, i.e., k·N messages are examined up to step k. To determine the unknown parameter, the regression parameter S, an "instantaneous" recursive-least-square (RLS) algorithm is used, which uses the residue as target function to minimize the sum of the squares of the modelling errors.

Figure 4:
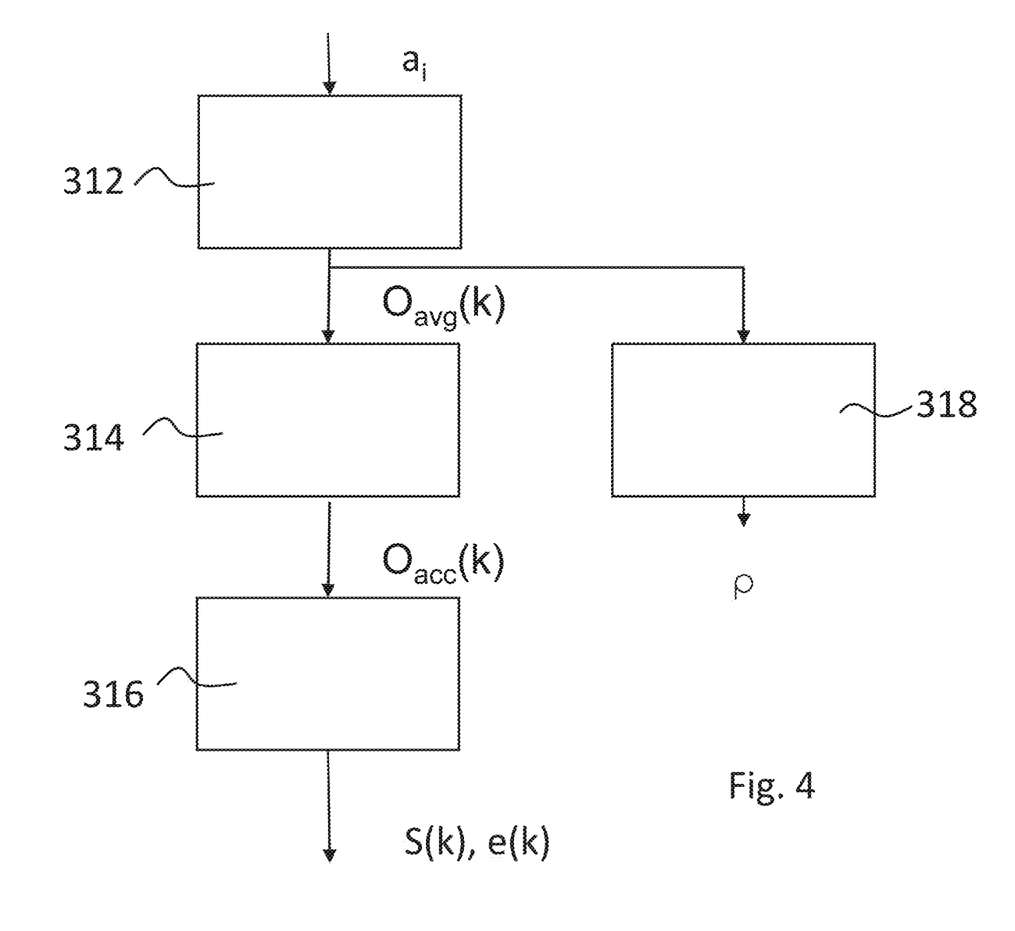
FIG. 4 shows a flowchart representing an operating step of the method.
Figure 5:
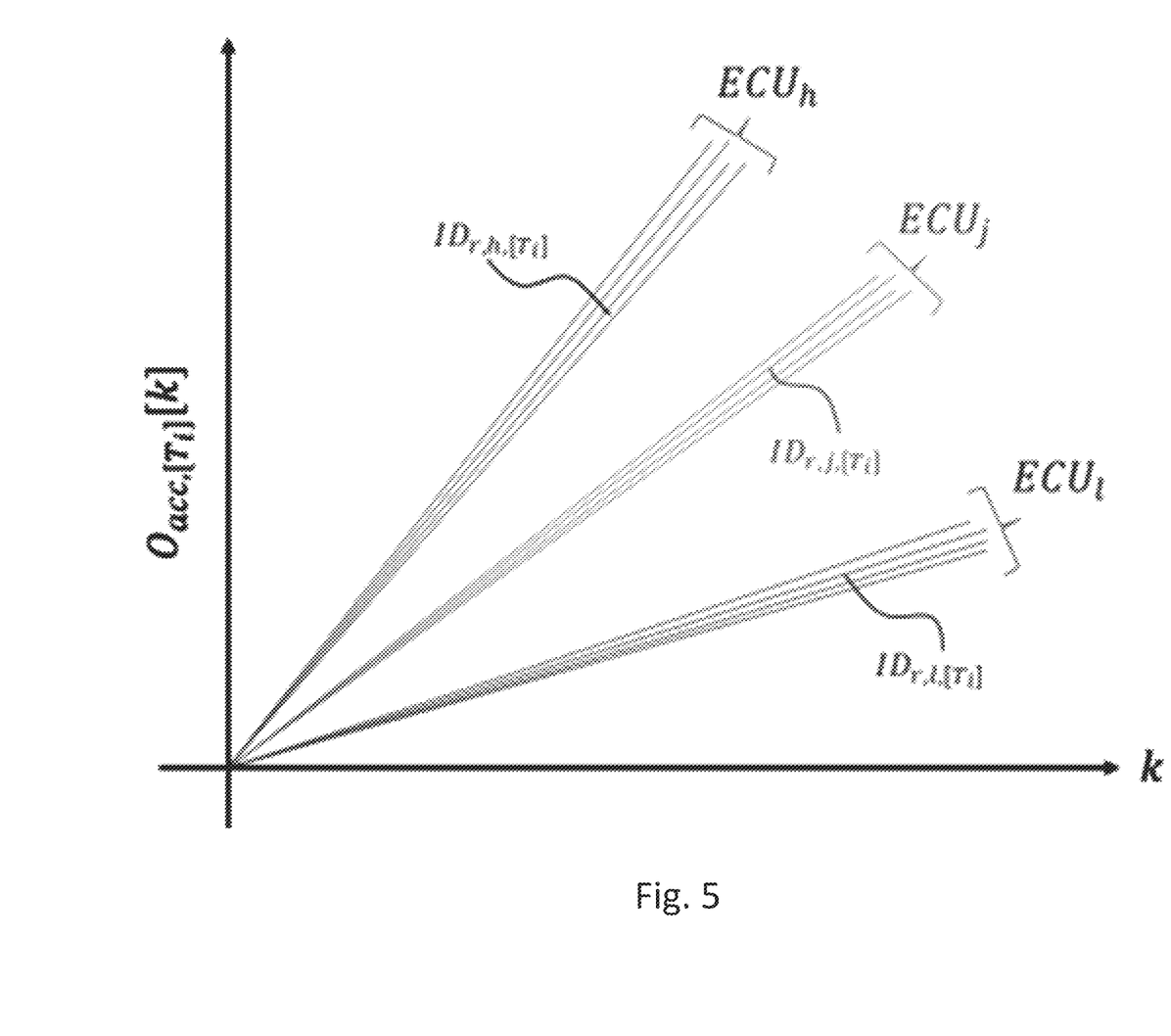
FIG. 5 shows a diagram that represents linear evolutions calculated by the aforesaid operating step of the method.

As shown in the flowchart of FIG. 4, which represents in detail the fingerprinting procedure 310, Eqs. (1)-(5) define an implementation of the fingerprinting operation 310 through an "instantaneous" recursive-least-square (RLS) algorithm, where, in a step 312, corresponding to implementation of Eq. (1), it is envisaged to compute an average-offset value $O_{avg}[k]$ for one or more intervals of a number N of received messages. Next, in a step 314, corresponding to implementation of Eq. (2), it is envisaged to compute a current accumulated offset value $O_{acc}[k]$ by adding to the previous value, calculated at the previous instant k−1, of accumulated value the average-offset value $O_{avg}[k]$ on the current interval, k, multiplied by the number N of received messages.

In this way, the time drift, or clock offset, designated by $O_{acc}[k]$ is accumulated.

By accumulating values of clock offset as indicated by Eq. 3, there is an increment of clock offset, i.e., the accumulated clock offset $O_{acc}[k]$, which is substantially linear and hence describes graphically a straight line, which is substantially unique for each of the message identifiers of each cluster, calculated as a function of the period T.

In step 316 there is hence solved the problem of regression as in Eq. (5), by computing in particular the regression parameter S and the identification error e corresponding to the values of accumulated clock offset $O_{acc}[k]$) obtained in the previous steps.

Provided hereinafter is an example in pseudocode used for recursive calculation and updating of the parameters of the linear model. Present at points 23 and 24 are, respectively Eqs. (1) and (2) (steps 312-314) of calculation of the accumulated clock offset that is entered into the procedure 300 of message analysis. A function SKEWUPDATE (t,e) updates the skew values (S[k]); in this function steps 3-5 correspond to the RLS algorithm. Steps 7-21 correspond to calculation of the timestamp intervals Tn, from the arrival times $a_n$-$a_{n-1}$, step 22 corresponds to calculation of the average interval. In step 25, the identification error(k) is computed as the difference between the accumulated offset and the straight line having as slope the skew S [k−1] at step k−1. Associated to the skew S[k], or regression parameter, is the least-square value of the function SKEWUPDATE (t,e).

1. Initialize: S[0]=P[0]=δI
2. Function SKEWUPDATE(t,e)▷ RLS algorithm
3.

$$G[k] \leftarrow \frac{\lambda^{-1}P[k-1]t[k]}{1+\lambda^{-1}t^2[k]P[k-1]}$$

4. P[k]←$\lambda^{-1}$(P[k−1]−G[k]t[k]P[k−1])
5. return S[k]←S[k−1]+G[k]e[k]
6. end function
7. for k-th step do
8. $a_0$←-timestamp of arrival of most recent received message
9. n←-1
10. while n≥N do
11. If current time>>$a_{n-1}$ then
12. /* it no longer receives the message */
13. $a_n$, . . . , $a_N$←-significantly high values
14. $T_n$, . . . , $T_N$←-significantly high values
15. break
16. else
17. $a_n$←-timestamp of arrival of n-th message
18. $T_n$←-$a_n$-$a_{n-1}$▷ timestamp interval
19. n←-n+1
20. end if
21. end while
22.

$$\mu_T[k] \leftarrow \frac{1}{N-1}\sum_{i=1}^{N-1} T_i \quad \triangleright$$

average timestamp interval
23.

$$O_{avg}[k] = \frac{1}{N-1}\sum_{k=2}^{N}[a_i - (a_1 + (i-1)\mu_T[k-1])]$$

24. $O_{acc}[k]$=$O_{acc}[k-1]$+|$O_{acc}[k]$|▷ accumulated offset
25. e[k]←-$O_{acc}[k]$−S[k−1]t[k]▷ identification error
26. S[k]←-SKEWUPDATE(t,e)▷ clock skew
27. end for What is obtained, in terms of accumulated clock offset appears in FIG. 6, which represents schematically the fact that for each ECU h, j, l there are as many straight lines as are the periodic messages, i.e., identifiers ID, that the respective ECU is expected to send on the communication bus. Given that each periodicity is analysed in a separate way from the others (in the sense that the messages with a period T of 10 ms are analysed separately from those with a period of 20 ms or some other periodicity), from the analysis of the clock offset the result described schematically hereinafter is obtained. In FIG. 6, by the notation $ID_{r,h,[T_i]}$ is understood the straight line constructed as described previously via RLS, corresponding to the r-th identifier ID sent by the h-th ECU with periodicity $T_i$, i.e., assigned by the clustering operation 200 to the cluster or group with periodicity $T_i$. In order to prevent any erroneous classification in the case where the sheaves of straight lines are too close to one another and there could hence be some ambiguity in the decision of the membership group, a correlation analysis (via Pearson coefficient) is used, in so far as there exists the technical evidence that, even though the accumulated clock offsets may be very close to one another, the variability with which the time drift persists remains unique for that specific ECU.

Figure 6A:
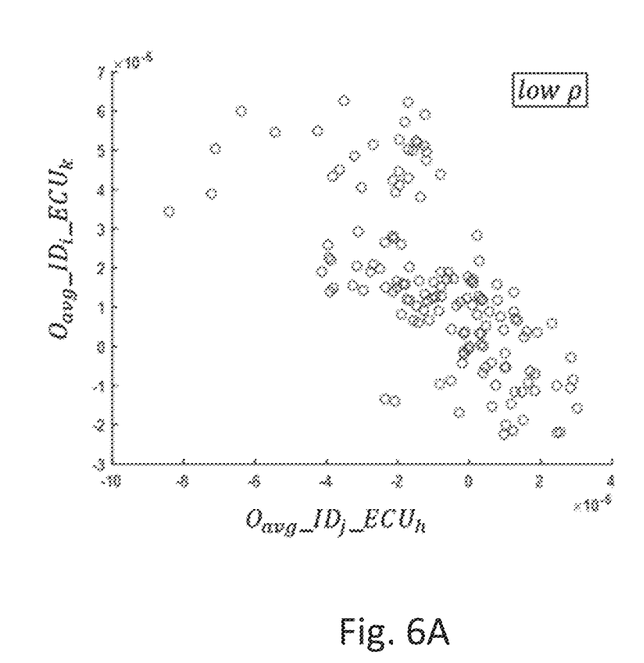
FIG. 6A and FIG. 6B are diagrams representing correlation functions calculated by the aforesaid operating step of the method in different operating conditions.
Figure 6B:
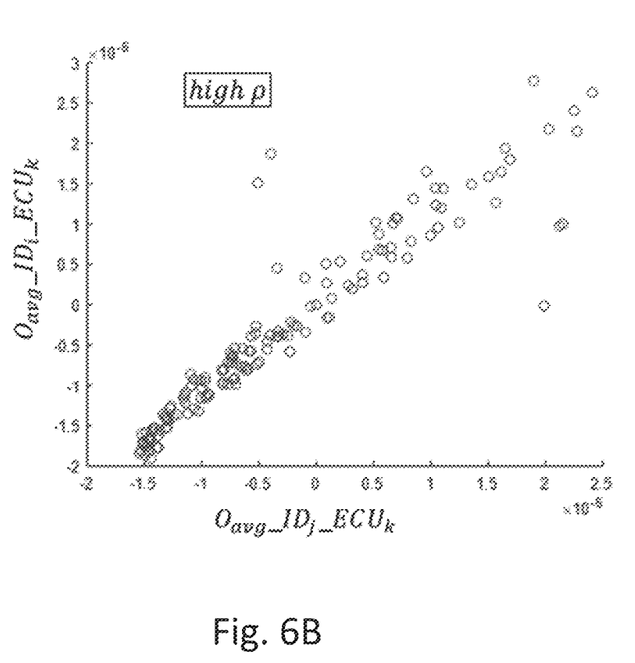

The procedure 310 further comprises, as shown in FIG. 4, computing in a step 318 a correlation index ρ of the average delay $O_{avg}$ of the messages. In this regard, FIG. 6A represents a diagram, where appearing on the abscissae is the average delay $O_{avg}$ of messages with identifier $ID_j$ sent by an ECU h, and appearing on the ordinates is the average offset $O_{avg}$ of messages with different identifier $ID_i$, but with one and the same periodicity, sent by a different ECU k. In the case where two messages have the same periodicity, but come from different ECUs, even though in effect they have associated a similar clock offset, they are in any case distinguishable by computing the correlation index ρ of the average offset $O_{avg}$ in so far as the correlation is low in absolute value. Instead, the messages coming from the same device/node/ECU, as shown in FIG. 6B, where the identifiers, $ID_i$, $ID_j$, are different, the periodicities are equal, and the ECU is the same, the ECU h, have an accumulated clock offset that is very similar and a correlation index ρ that is very high (the experimental evidence indicates a value higher than 0.8).

Consequently, computed in step 318 are correlation indices ρ of pairs of messages with similar period, which hence belong to one and the same cluster obtained from the clustering operation 200, with different identifiers $ID_i$, $ID_j$, which in reception are found to come from one and the same ECU or node 11 (for example, the ECU h as in FIG. 6B), and the corresponding average-offset values $O_{avg}$ calculated in step 312 are derived.

The subsequent anomaly-detection procedure 320 is based on the analysis of the change of slope, i.e., S[k], and intercept, i.e., e[k], of the straight lines $ID_{r,h,[T_i]}$, supplied in step 316, corresponding to which are in effect the anomalies/attacks described previously. In particular, a change of slope S[k] corresponds to a variation of the periodicity of the message with that specific identifier ID, i.e., for the straight line $ID_{r,h[T_i]}$, the message $M_r$ of the group with period $T_i$ from the node or ECU h. If the period increases (the frequency at which it is sent decreases), then the slope S[k] decreases (the straight line is less "inclined"). Instead, if the period decreases (and the frequency increases), the straight line has a steeper slope S[k].

The joint analysis of the accumulation of clock offsets, and hence of slope S[k] and intercept e[k] of the straight line (supplied by step 316), and of the correlation index ρ between messages that apparently have the same origin makes it possible both to understand whether the communication network is under attack, consistently with the previous definitions of anomaly, and to understand from which ECU (node 11) a certain message with a specific identifier $ID_r$ comes, where r is the index of the message identifiers, to each value of r there corresponding a different identifier, in particular in the list of the identifiers allowed accessible to the device 20.

Figure 7:
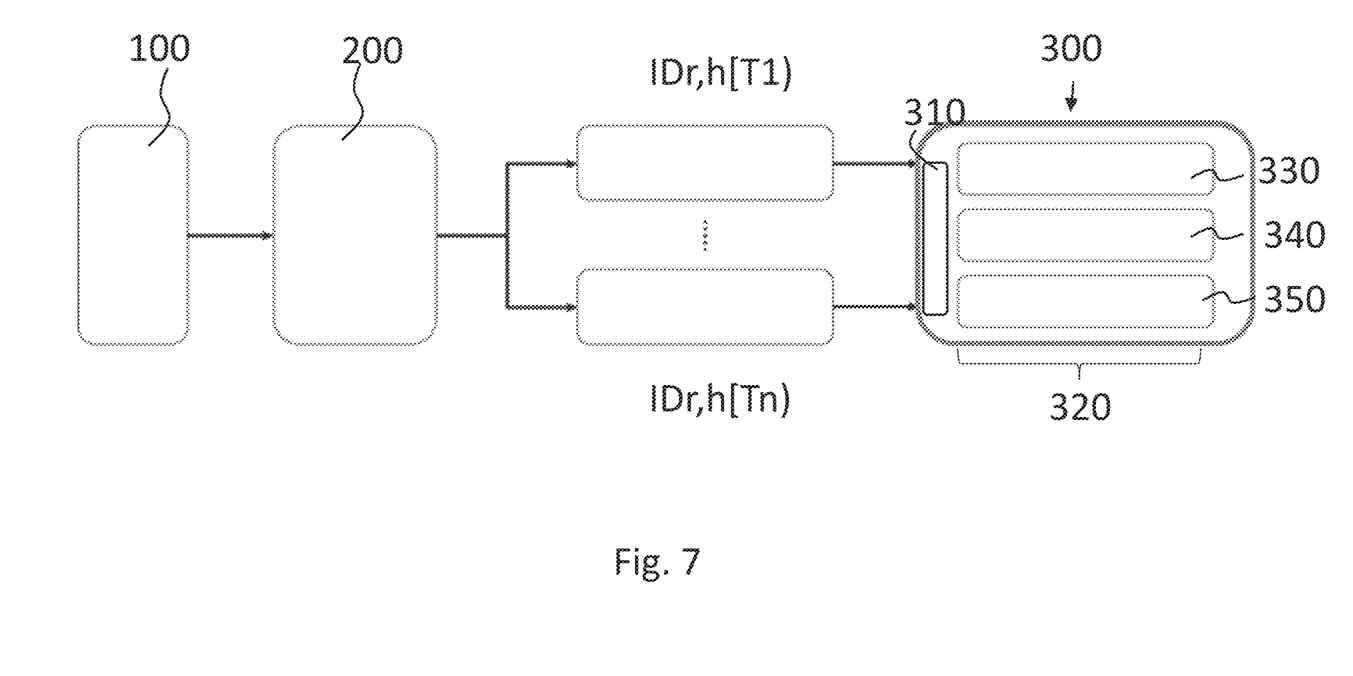
FIG. 7 is a schematic diagram that represents schematically an embodiment of the method described herein.

FIG. 7 hence shows a diagram of an embodiment of the method so far described.

Indicated by block 100 is a white-listing step, i.e., of application of a white-list filter, namely, a filter that allows only passage of the elements indicated in a list, the white list, as a step preliminary to steps 200 and 300. This filter makes it possible to accept only the message identifiers ID effectively present in the white list associated to the control node. Types of identifiers ID not belonging to the list may be discarded, recorded in special data structures, and possibly reported to the user through specific signals.

Designated by 200 is then the clustering or grouping step that on the messages carries out the separation according to the period to obtain the groups of messages $ID_{r,h,[T_1]}, \ldots, ID_{r,h,[T_n]}$.

The above groups of messages are supplied to the message-analysis procedure 300, which comprises the fingerprinting procedure 310 and the anomaly-detection procedure 320.

Figure 8:
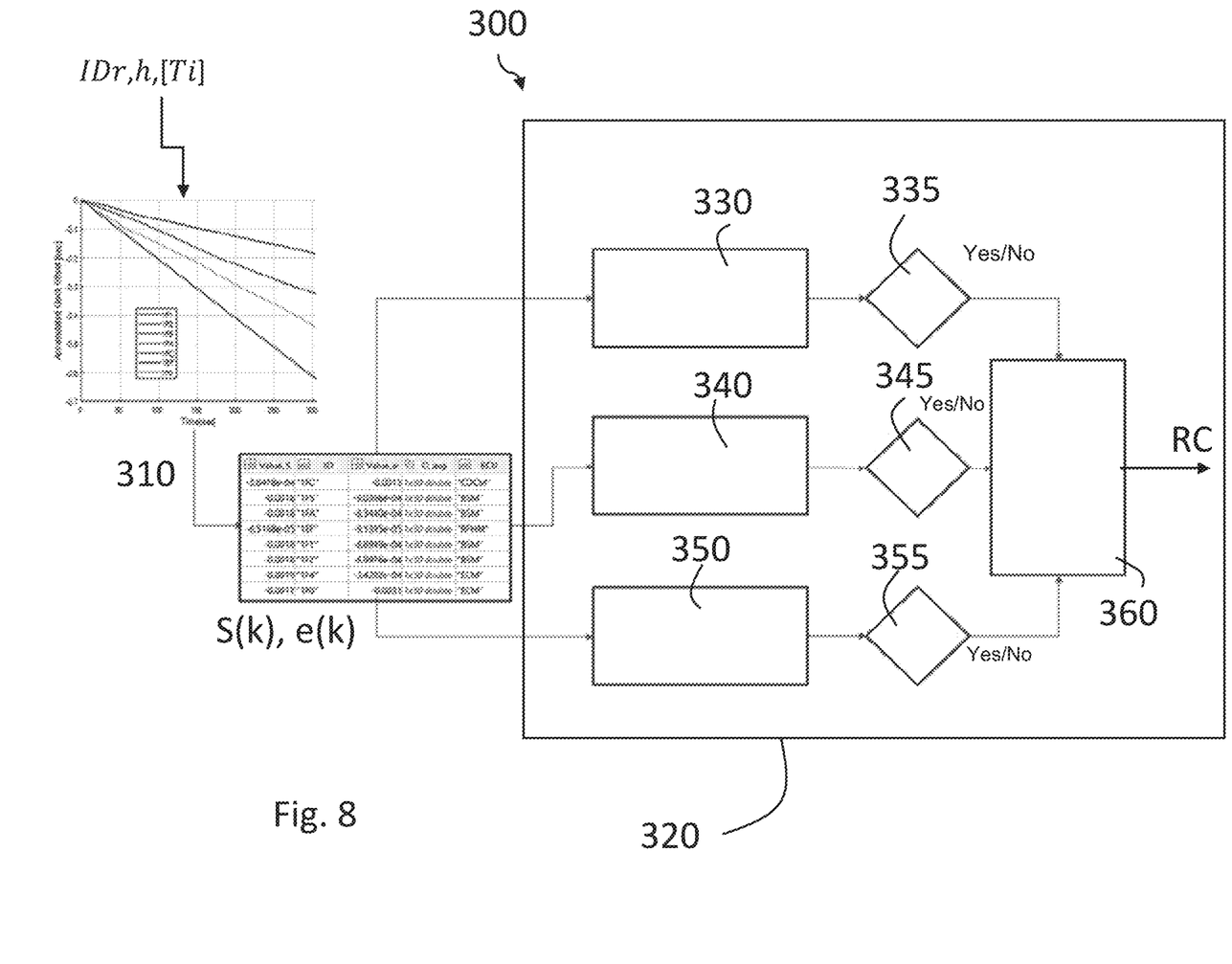
FIG. 8 is a diagram that represents schematically steps of the method described herein.

FIG. 8 shows in greater detail the above message-analysis procedure 300.

As has been said, the procedure 310 obtains, from the arrival times $a_i$ of the groups of messages $ID_{r,h,[T_1]}, \ldots, ID_{r,h,[T_n]}$, the respective slopes and intercepts, S[k], e[k] via Eqs. (1)-(2) (or alternatively Eq. (3) and (4)) and calculation of a regression (Eq. (5)).

In the anomaly-detection procedure 320, it is next envisaged to perform, on the basis of the values of slope S[k] and intercept e[k], as well as the correlation values ρ, calculated on the received messages, downstream of the clustering procedure 200 and the whitelisting procedure 100, a classification, for example through a three-level decisional logic classifier.

Hence, the procedure 320 comprises a step of correlation analysis 350 on messages belonging to one and the same group of messages $ID_{r,h,[T_i]}$. As described in FIG. 11 in the above correlation analysis there is computed a correlation index ρ between the average offsets $O_{avg}$ of pairs of messages coming from one and the same control unit h in the group of messages with the same period $T_i$.

Once the values of correlation ρ have been obtained in step 350, then in a testing step 355 a check is made to verify whether the value of correlation index ρ is higher than a value, that preferably can be set, for example 0.8. Supplied to the classifier 360 is the information on whether the testing step 355 has yielded a positive result or a negative result (e.g., yes/no, or pass/fail).

The procedure 320 further comprises a step 330 of comparison of slopes S[k] associated to consecutive messages belonging to one and the same group of messages $ID_{r,h,[T_i]}$. In particular, selected in step 330 are the values of slope of two consecutive messages. Then, in step 335 a check is made to verify whether their difference is greater than a slope threshold STH set.

Supplied to the classifier 360 is the information on whether the testing step 335 has yielded a positive result or a negative result (e.g., yes/no, or pass/fail).

The procedure 320 further comprises a step 340 of comparison of values of intercept e[k] associated to consecutive messages belonging to one and the same group of messages $ID_{r,h,[T_i]}$.

In particular, selected in step 340 are the values of error or intercept e[k] of two consecutive messages received; then, in the testing step 345 a check is made to verify whether their difference is greater than a slope threshold ETH set.

Supplied to the classifier 360 is the information on whether the testing step 345 has yielded a positive result or a negative result (e.g., yes/no, or pass/fail).

The classifier 360 is of a heuristic type and is configured, for example, via logic rules of an IF, ..., THEN type. Other alternative embodiments of pattern-recognition classifier are possible, including neural networks. In alternative embodiments, the classifier 360 may comprise one or more further input quantities or information data.

In a preferred embodiment, supplied to the classifier 360 is first the result of the test 355 on the correlation index, and then the result of the other two tests 335 and 345, preferably first the test 335 and then test 345. It has been found that this order of the tests presents advantages in terms of classification accuracy, but it is clear that in variant embodiments it is possible to order the tests differently.

Hence, for example, if the correlation analysis 350-355 yields a negative result, or if the slopes of two straight lines nominally belonging to the same ECU are very different (steps 330-335), the classifier 360 records a classification error. This classification error can be reported to the user via a specific signal, or recorded in data structures to generate other types of events.

Hence, it is envisaged to supply the results of said first check 350, said second check 330, and said third check 340 to an operation of message classification, performed by the classifier 360, configured to supply a result RC comprising a confirmation of message classification according to the transmitting node 11, for example the ECU h, and the message identifier, ID, or an indication of classification error as a function of said results.

If the correlation coefficient p in the check 350 is higher than a first given threshold, the classification operation indicates the node that is transmitting the messages as corresponding to the nominal node; if it is lower, it records a classification error and indicates the transmitting node as being different from the nominal node.

If the second check 330 yields a negative result, i.e., there is a change in slope, the classification operation 360 indicates as result RC a masquerade attack.

If the third check 340 yields a negative result, the classification operation 360 indicates as result RC a fabrication attack.

As has been said, in one embodiment, the above classification operation 360 is an operation of decisional logic discrimination in which first the result of the first check 350 is evaluated, i.e., whether the correlation coefficient ρ is higher than a first given threshold, and the result of the second check and/or the result of the third check are/is evaluated if the result of the first check is affirmative.

The method described hence exploits the information known a priori to check the correlation between identifiers ID belonging to one and the same ECU, or node 11. By information known a priori, in so far as it is stored in the device 20 or in any case accessible thereto, is understood the information concerning the network topology, the number of ECUs, or more in general of transmitting nodes 11, and the number and type of identifiers ID transmitted by each of these ECUs.

Hence, from what has been described above, the advantages of the solution proposed emerge clearly.

The solution described advantageously makes it possible to perform as a virtual MAC, recognizing the behaviour of the specific device starting from the time drift of the periodic messages that itself sends over the network bus.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for protection from cyber attacks in a communication network, in particular a CAN (Controller Area Network), of a vehicle, wherein the vehicle includes a communication bus, in particular a CAN-bus, and a plurality of nodes associated to said communication bus in a signal-exchange relationship and associated at least in part to control units for controlling functions of the vehicle, wherein the nodes exchange messages passing between nodes of the plurality of nodes, and the messages are identified by respective message identifiers, said method including, at a control node associated to said communication bus, the steps of:

selecting, from among the messages exchanged between the nodes, periodic messages having a transmission periodicity, grouping said periodic messages into respective groups according to the respective period, and performing a procedure of analysis of messages of the nodes that exchange said received periodic messages, which comprises, for each group of transmission periodicity:

obtaining times of arrival at the respective nodes of a set of periodic messages that have the same message identifier, computing as a function of said arrival times average-offset values over successive subsets, of a given number of messages, of said set of received messages, accumulating said average-offset values for each identifier with respect to each successive subset to obtain accumulated-offset values for each successive subset and a respective identifier, identifying linear parameters by computing a regression over said accumulated-offset values for each successive subset and respective identifier, said computation comprising computing an angular coefficient, or slope, of the regression, and an intercept, or identification error, computing, on the basis of average-offset values obtained at the step of computing as a function of said arrival times average-offset values over successive subsets, a correlation coefficient (p) of the average offset of pairs of messages identified as coming from one and the same node, performing a first check to determine whether the correlation coefficient is higher than a first given threshold, performing a second check to determine whether the angular coefficient between two consecutive messages with the same identifier is higher than a second given threshold, performing a third check to determine whether the intercept between two consecutive messages is higher than a third given threshold, and supplying the results of said first check, said second check, and said third check to a message-classification operation, configured to supply a confirmation of classification of the messages according to the transmitting node and message identifier or an indication of classification error as a function of said results.

2. The method as set forth in claim 1, wherein, if the correlation coefficient is higher than a first given threshold, the classification operation further includes the step of indicating the node that is transmitting the messages as corresponding to the nominal node; if the correlation coefficient is lower, the classification operation indicates a classification error and indicates the transmitting node as being different from the nominal node.

3. The method as set forth in claim 1, wherein, if the second check has a negative outcome, the classification operation further includes the step of indicating a masquerade attack.

4. The method as set forth in claim 1, wherein, if the third check has a negative outcome, the classification operation indicates further the step of indicating a fabrication attack.

5. The method as set forth in claim 1, wherein said classification operation is an operation of decisional logic discrimination in which the result of the first check as to whether the correlation coefficient is higher than a first given threshold is evaluated first, and the result of the second check and/or the result of the third check are/is evaluated if the result of the first check is affirmative.

6. The method as set forth in claim 1, wherein information known a priori, concerning the topology of the network and/or the transmitting nodes and/or the number and type of identifier of the messages transmitted by each of said nodes, is accessible for performing the operations of the method.

7. The method as set forth in claim 1, which further includes an operation of filtering with white list, which accepts only the message identifiers actually present in said white list associated to the control node.

8. The method as set forth in claim 1, wherein said operation of measuring arrival times is performed by acquiring the timestamp of arrival of the messages.

9. A device for protection from cyber attacks in a communication network, in particular a CAN (Controller Area Network), of a vehicle, said network comprising:
- a communication bus, in particular a CAN-bus, and
- a plurality of nodes associated to said communication bus in a signal-exchange relationship and associated at least in part to control units for controlling functions of the vehicle,
- said nodes exchanging messages passing between nodes of said plurality of nodes, and
- said messages being identified by respective message identifiers,
- wherein said device is configured to operate according to the method as set forth in claim 1.

* * * * *